United States Patent
Sanocki et al.

(10) Patent No.: US 8,696,858 B2
(45) Date of Patent: Apr. 15, 2014

(54) APPARATUS AND METHOD FOR IMPROVING CENTER HOLE RADIAL RUNOUT CONTROL IN OPTICAL DISK MANUFACTURING

(75) Inventors: Daniel Jay Sanocki, Camarillo, CA (US); Alan Bruce Hamersley, Newbury Park, CA (US); William Garrick Lucas, Camarillo, CA (US)

(73) Assignee: Thomson Licensing, Boulogne-Billacourt (FR)

( * ) Notice: Subject to any disclaimer, the term of this patent is extended or adjusted under 35 U.S.C. 154(b) by 1069 days.

(21) Appl. No.: 11/884,902

(22) PCT Filed: Mar. 2, 2005

(86) PCT No.: PCT/US2005/006787
§ 371 (c)(1),
(2), (4) Date: Aug. 22, 2007

(87) PCT Pub. No.: WO2006/093495
PCT Pub. Date: Sep. 8, 2006

(65) Prior Publication Data
US 2008/0149266 A1    Jun. 26, 2008

(51) Int. Cl.
*B29C 65/14*    (2006.01)
*G11B 7/26*    (2006.01)

(52) U.S. Cl.
USPC .................. 156/275.1; 156/275.5; 156/275.7

(58) Field of Classification Search
USPC ................. 156/275.1, 74, 272.2, 275.5, 275.7
See application file for complete search history.

(56) References Cited

U.S. PATENT DOCUMENTS

| 6,154,441 | A * | 11/2000 | Sandstrom et al. | ........... 369/282 |
| 6,224,702 | B1 | 5/2001 | Kitano et al. | |
| 6,296,734 | B1 | 10/2001 | Albertson et al. | |
| 6,982,016 | B2 * | 1/2006 | Ohno et al. | ...................... 156/64 |
| 7,047,545 | B2 * | 5/2006 | Hisada et al. | .................. 720/718 |
| 2001/0040010 | A1 | 11/2001 | Albertson et al. | |
| 2004/0134603 | A1 | 7/2004 | Kobayashi et al. | |
| 2004/0149380 | A1 * | 8/2004 | Miyamoto et al. | .......... 156/307.3 |
| 2008/0206570 | A1 * | 8/2008 | Ito et al. | ..................... 428/411.1 |

FOREIGN PATENT DOCUMENTS

| JP | 3-69321 | 3/1991 |
| JP | 09-245387 | * 9/1997 |
| JP | 2000-260072 | 9/2000 |
| JP | 2000-322776 | 11/2000 |
| JP | 2004-145984 | 5/2004 |

OTHER PUBLICATIONS

JP 09-245387 English Abstract, Sep. 1997.*
Search Report Dated May 17, 2005.

* cited by examiner

*Primary Examiner* — Richard Crispino
*Assistant Examiner* — Elizabeth Royston
(74) *Attorney, Agent, or Firm* — Robert D. Shedd

(57) ABSTRACT

An apparatus and method for controlling radial runout between stacked disk portions (14, 18) and providing a cylindrical pin (20) having at least two diameters (22, 24). The pin is dimensioned and configured to permit the disk portions, which have different center hole dimensions, to be indexed such that a center hole of each disk portion is received by a separate diameter of the pin. The disk portions are maintained in spatial relationship as provided by the pin by spot curing a portion of the adhesive.

7 Claims, 2 Drawing Sheets

APPARATUS AND METHOD FOR IMPROVING CENTER HOLE RADIAL RUNOUT CONTROL IN OPTICAL DISK MANUFACTURING

This application claims the benefit, under 35 U.S.C. §365 of International Application PCT/US2005/006787, filed Mar. 2, 2005, which was published in accordance with PCT Article 21(2) on Sep. 8, 2006 in English.

FIELD OF THE INVENTION

The present invention generally relates to manufacturing optical disks such as compact disks (CDs) and digital video disks (DVDs) and, more particularly, to an apparatus and method for controlling radial runout between constituent disk layers of an optical disk.

BACKGROUND OF THE INVENTION

Digital disks such as compact disks (CDs) or digital versatile disks (DVDs) may include a multiple layer process for manufacture. The disk may include a first layer having a pattern of microscopic pits or readout information applied thereto. The pattern of pits includes the digital readout information for the disk. The layer may have one or more additional layers applied to it. The readout surface may include a single or dual-layer readout surface that may include a sputtered-on reflective (e.g., aluminum) layer. These one or more additional layers may be bonded to the first layer or subsequent layers to form a completed optical disk.

Each layer may include a different material with its associated material properties. Since these layers are typically polymeric, large mismatches can occur due to differences in the coefficients of expansion/contraction of the materials. These polymeric materials are generally molded and shrink at different rates when cooled. The shrinkage can be accounted for by compensation in the size and tolerance of the molds used to produce the disk layer. However, designing and modifying molds is costly and difficult. The level of complexity is increased greatly by attempting to account for mold shrinkage for parts made from different materials, especially when these materials need to line up or fit together.

When two disks are being bonded, mismatches in alignment relative to the center hole (radial runout) of the disks needs to be controlled. This becomes especially difficult when the disks are formed from different materials.

SUMMARY OF THE INVENTION

An apparatus and method for controlling radial runout between stacked disk portions of an optical disk includes forming an adhesive layer between disk portions and providing a cylindrical pin having at least two diameters. The pin is dimensioned and configured to permit the disk portions, which have different center hole dimensions, to be indexed such that a center hole of each disk portion is received by a separate diameter of the pin. The disk portions are maintained in spatial relationship as provided by the pin by spot curing a portion of the adhesive layer.

An apparatus for controlling radial runout between disk portions of an optical disk includes a cylindrical pin having at least two diameters. The pin is dimensioned and configured to permit disk portions having different center hole dimensions to be indexed such that a center hole of each disk portion is received by a separate diameter of the pin. A retaining means maintains the disk portions in spatial relationship therebetween as provided by the pin.

Another apparatus for controlling radial runout between disk portions of an optical disk includes a platform, which supports a stack of disk portions. A cylindrical pin is mounted in the platform and has at least two diameters. The pin is dimensioned and configured to permit the disk portions having different center hole dimensions to be indexed such that a center hole of each disk portions is received by a separate diameter of the pin. At least one light source is provided on the platform in spatial relationship with the pin to permit spot curing of adhesive between disk portions to maintain the disk portions in spatial relationship therebetween as provided by the pin.

BRIEF DESCRIPTION OF THE DRAWINGS

The advantages, nature, and various additional features of the invention will appear more fully upon consideration of the illustrative embodiments now to be described in detail in connection with accompanying drawings wherein.

It should be understood that the drawings are for purposes of illustrating the concepts of the invention and are not necessarily the only possible configuration for illustrating the invention.

DETAILED DESCRIPTION OF THE INVENTION

The present invention provides a method and apparatus for controlling radial runout between disk portions (e.g., layers, substrates or halves) in the manufacture of optical disks. In one particularly useful embodiment, an apparatus includes a multiple diameter pin. The pin includes two or more different diameters, each diameter dimensioned to accommodate a center hole of a particular type of disk portion (or half). The center hole may vary between disk portions as a result of different materials with different thermal characteristics or other reasons. The pin may be part of a fixture, which includes a spot-curing device. The spot-curing device may include predetermined locations where a curable material is placed between the disk portions so as to provide a quick cure of an adhesive to bond the disks either permanently or temporarily. In this way, the disk positions are maintained, aligned and the disk is movable to permit a full cure without the worry of misalignment.

It is to be understood that the present invention is described in terms of a DVD manufacturing process and system; however, the present invention is much broader and may include any optical disk manufacturing process including compact disks, laser disks, etc. In addition, the present disclosure will refer to disk layers or portions. Disk layers may include bond substrates, temporary substrates, intermediary tools or pads, or any disk that needs to be aligned to any other disk.

It should also be understood that the elements shown in the FIGS. may be implemented in various forms of hardware, software or combinations thereof. Preferably, these elements are implemented in hardware controlled manually or by one or more appropriately programmed general-purpose devices, which may include a processor, memory and input/output interfaces. One skilled in the art with knowledge of the present disclosure would understand that different mechanical configurations/setups and variations may be employed for achieving the desired results.

Figure 1:
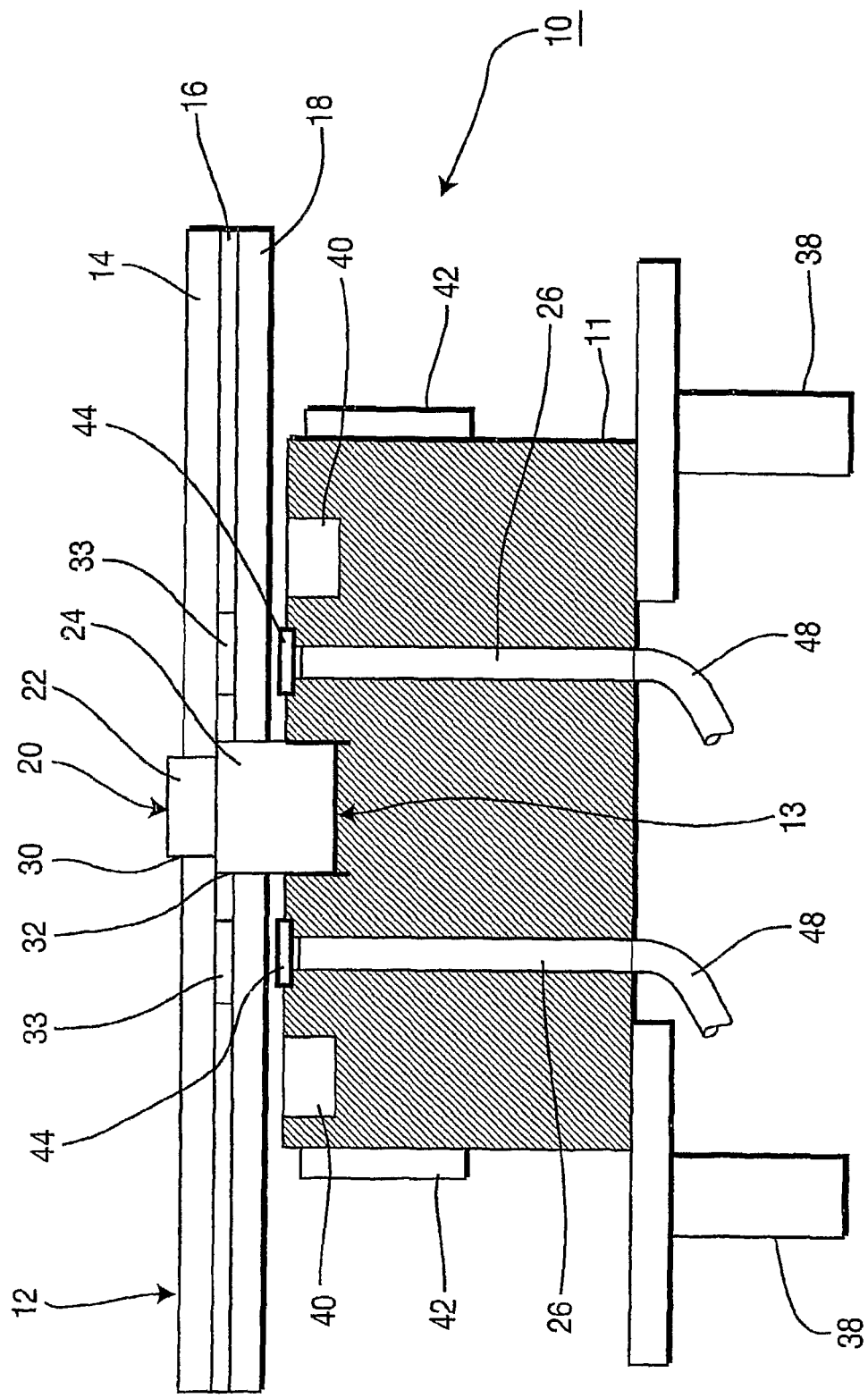
FIG. 1 is a schematic cross-sectional view showing an apparatus for controlling radial runout between disk portions in accordance with an illustrative embodiment.

Referring now in specific detail to the drawings in which like reference numerals identify similar or identical elements throughout the several views, and initially to FIG. 1, an apparatus 10 for controlling radial runout and alignment between disk portions or layers of an optical disk is illustratively shown. Apparatus 10 may include a platform 11, which maintains one or more components of apparatus 10 in spatial and operational relationships relative to one another. Platform 11 may include a recess 13 formed therein to support a pin 20. Pin 20 preferably includes two or more different diameters. For example, a first portion 24 of pin 20 includes a larger diameter portion than a portion 22. Each diameter of pin 20 corresponds to an interference fit with each of a plurality of disk portions (e.g., 14 and 18). The interference fit is preferably sufficient to maintain the portions of disk portions 14 and 18 until a retaining means, such as, e.g., a spot cure can be achieved.

Portions 22 and 24 are dimensioned and configured to index portions of an optical disk 12. For example, a first layer 14 may be formed from a first material, and a second layer 18 may be formed from a second material. These layers 14 and 18 made from different materials may include different inside diameters 30 and 32, respectively for a center hole of disk 12. Since the materials, dimensions tolerances or other mismatches can occur between disk portion 14 and disk portion 18, pin 20 accounts for these changes and controls radial runout between disks 14 and 18. Many of the mismatches between disks 14 and 18 are predictable when the disks 14 and 18 are mass-produced, however, these differences may change from lot to lot or production conditions. It is therefore advantageous to provide a plurality of pins 20, each having different combinations of diameters (22 and 24). Ach pin may be received in recess 13 which may include a mechanism for holding pin 20 therein.

Disks 14 and 18 are preferably brought together with an adhesive 16. Adhesive 16 may include a radiation curable material or photosensitive material, such as ultraviolet curable materials or lacquer. Infrared (heat) curable adhesives may also be employed. These adhesive materials may include liquids, which include cross-linking molecular structures when exposed to light (e.g., UV light).

Platform 11 may include light guides 48 connected to sources (not shown) to bring light through platform 11. This light may be employed to cure portions of adhesive 16. Alternately, sources 26 may be provided on platform 11, e.g., in the form of light emitting diodes, etc.

In one embodiment, disk portions 14 and 18 sandwich a layer of lacquer or UV curable material, which is spread across the entire or a large portion of the space between portions 14 and 18. Light guides or sources 26 provide curing of adhesive 16 in one or more localized areas 33 to ensure that the disk portions 14 and 18 are temporarily or permanently bonded to each other upon curing in the localized areas 33.

To maintain the alignment during subsequent handling, the lacquer or adhesive 16 is spot cured, preferably near the center hole 30 to lock the portions 14 and 18 together to lock the portions 14 and 18 together. Disk 12 may then be disconnected from pin 20 and moved to a curing station or device (not shown) to fully cure remaining portions of adhesive 16.

Sources 26 and pin 20 are advantageously held in positional or spatial relationship with each other by employing platform 11. In one embodiment, sources 26 are maintained with space between pin 20 and spot cure areas 33, such that the light source 26 is located relative to in 20 to prevent curing of a full ring of an inner portion of the adhesive layer that is adjacent to both the in and a cured full ring area 33. In this way, lacquer 16 around pin 20 is not cured to permit easy removal of pin 20 during further processing of disk 12.

Spot curing may be accomplished using a UV light source 26, which may include a mercury, metal halide or UV light emitting diode (LED). In an automated embodiment, pin 20 may be inserted through disk 12 and platform 11 moved into position to receive pin 20, or pin 20 may be inserted in center holes 30 and 32 by moving platform 11 with pin 20 to receive disk portions 14 and 18, or the pre-assembled substrates with lacquer will be transported to platform 11 and installed on pin 20. Platform 11 may be positioned using an actuator, robot arm or servo 38 or other suitable means, which may be computer controlled or controlled by dedicated processing hardware/software. Pin 20 may be attached to platform 11 or removable connected to platform 11. In an alternate arrangement, pin 20 may be maintained in optical disk 12 and serve as a grip position as needed.

Once disk portions 14 and 18 are installed on pin 20, sources 26 may be triggered by a photoswitch(es) 40 installed in platform 11 to sense the proximity of disk 12. A relay or programmable logic circuit 42 is employed to activate sources 26 for a predetermined amount of time sufficient to provide a spot cure adhesive 16 to maintain portions 14 and 18 is a desired position. It is to be understood that sources 26 may include a single source or multiple sources and may be positioned at any location relative to disk 12. In addition, while two disk portions 14 and 18 are shown, a greater number of disk portions may be employed and spot cured in a similar method. Likewise, each source 26 may have its own sensor 40, and relay/switch 42 or share sensors 40 and relays/switches 42.

Advantageously, portions 14 and 18 may be formed from different materials such as different densities of polycarbonate or other suitable materials. In addition, the multiple diameter pin 20 may be employed to accommodate disk portions 14 or 18 which may have been made at different times, in different molds, with different materials or have other reasons that include variations in the inside diameter dimension of center hole 30, which may be addressed by pin 20.

A manufacturer of disks may have a plurality of pins 20, each having a combination of different diameters at different longitudinal positions along the pin 20. For example, a portion 22 may include a diameter of between about 15.03 mm and about 15.07 mm, while portion 24 may include a diameter of between about 15.08 mm and about 15.11 mm. Since pin 20 may include a metal such as aluminum, tool steel, ceramic or an expanding pin, pin 20 may be formed on a lathe or other machining process to maintain very high tolerances. Alternately, plastic or other materials may be employed which are similar in material properties as one or both of disk portions 14 and 18. By providing, a pin 20 made with high tolerances maintained in this way, modification and design of molds to account for shrinkage is minimized or eliminated resulting is substantial savings in time and money. This loosens the mold tolerances and the shrinkage predicting that accompanies mold design.

The very high tolerance pin 20 reduces radial runout that would normally be introduced in aligning disk portions 14 and 18. By providing a multiple diameter pin 20, it is easy to switch between different-material disk-portion molding and bonding and same-material disk-portion molding and bonding. For processes and equipment that employs multiple alignment pins, employing a pin 20 can avoid difficulties and simplify curing, handling, alignment and cleaning processes. Fewer close tolerance pins are needed, less pin cleaning is needed due to the pre-curing (spot cure) near the center hole, fewer close tolerance parts are needed, etc. With a full diameter, inner diameter cure, no wet lacquer will be available to contaminate downstream components, and therefore less cleaning is needed.

Figure 2:
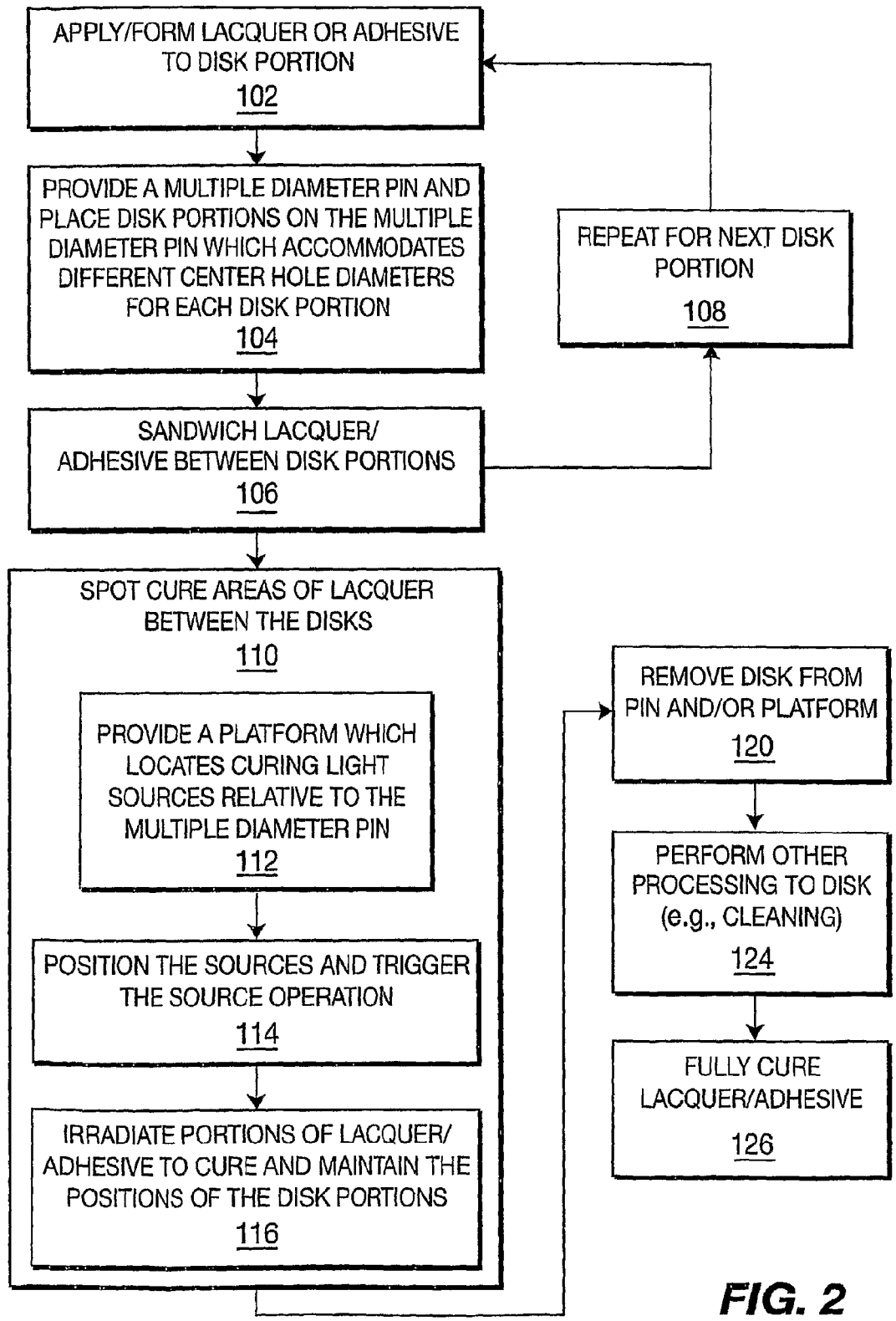
FIG. 2 is a block/flow diagram showing a method for controlling radial runout between disk portions in accordance with an illustrative embodiment.

Referring to FIG. 2, a method for reducing radial runout between two or more disk portions having different center hole diameters is shown in accordance with an illustrative embodiment. In block 102, a lacquer or adhesive is applied to a disk portion. The lacquer/adhesive preferably includes a quick curing material such as UV curable material. The lacquer/adhesive may by distributed over a portion of the entire surface of the disk portion.

In block 104, the two disks are brought together to sandwich the lacquer/adhesive therebetween. In block 106, the disk portions with lacquer/adhesive (having a different center hole diameters) are placed on a multiple diameter pin and secured thereto. The pin indexes the two disks to align their centers as described above. The process of adding additional disk portions with lacquer/adhesive may be continued in block 108 if more than two disk portions are to be joined.

In block 110, the lacquer/adhesive is spot cured to maintain the alignment and spacing between disk portions. This may include, in block 112, providing a platform, which locates curing sources (e.g., UV light sources) relative to the pin. In one embodiment, these curing sources are maintained at a distance from but close to the center hole. In this way, the lacquer/adhesive near the pin will not cure to permit removal of the completed disk from the pin. In block 114, the curing sources or light sources are brought closer to the disk portions and triggered to be activated. This may include using a photosensor switch and a relay/logic to turn on the sources. In block 116, portions of the lacquer/adhesive are irradiated to create the spot cure at the desired positions in the disk.

In block 120, the disk may now be removed from the pin since the spot cure will ensure that the gap between disk portions will be maintained as well as the alignment of the center holes between the disk portions. Other processes may be performed on the completed disk in block 124. These processes may include cleaning the disk, or even storing the disk for later curing. In block 126, the remaining lacquer/adhesive may be cured and processing may continue to finish manufacture of the optical disk.

Having described preferred embodiments for an apparatus and method for controlling radial runout between disk portions of an optical disk (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims.

The invention claimed is:

1. A method for indexing stacked disk portions of an optical disk, comprising the steps of:
   providing a cylindrical pin having at least two fixed diameters, the pin being configured to permit the disk portions having different center hole dimensions to be indexed such that a center hole of each disk portion is received by a separate fixed diameter of the pin;
   forming an adhesive layer between disk portions, said adhesive layer extending fully to the pin; and
   maintaining the disk portions in a spatial relationship as provided by the pin by spot curing a full ring of a first inner portion of the adhesive layer located near the center hole, wherein the light source for spot curing is located relative to the pin to prevent curing of a full ring of a second inner portion of the adhesive layer that is adjacent to both the pin and the first inner portion of the adhesive layer.

2. The method as recited in claim 1, wherein the adhesive includes an ultraviolet (UV) light curable material and further comprising the step of irradiating portions of the adhesive with a UV light.

3. The method as recited in claim 1, wherein the spot curing includes triggering operation of the light source when the disk portions are brought in proximity of the light source.

4. The method as recited in claim 1, wherein the triggering operation is triggered by a sensor switch.

5. The method as recited in claim 1, further comprising the step of fully curing remaining adhesive in a separate curing step.

6. The method as recited in claim 1, wherein maintaining the disk portions in spatial relationship involves employing a programmable logic circuit to activate the light source for a predetermined amount of time sufficient to provide a spot cure adhesive to maintain the portions in a desired position.

7. The method as recited in claim 1, wherein the cylindrical pin is comprised of aluminum or ceramic.

\* \* \* \* \*